United States Patent
Hayakawa et al.

(10) Patent No.: US 6,191,062 B1
(45) Date of Patent: *Feb. 20, 2001

(54) PHOTOCATALYTIC FUNCTIONAL MATERIAL AND METHOD FOR PRODUCING THE SAME

(75) Inventors: Makoto Hayakawa; Makoto Chikuni; Toshiya Watanabe, all of Kitakyusyu (JP)

(73) Assignee: Toto Ltd., Fukuoka-ken (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/849,645

(22) PCT Filed: Nov. 16, 1995

(86) PCT No.: PCT/JP95/02340

§ 371 Date: May 15, 1997

§ 102(e) Date: May 15, 1997

(87) PCT Pub. No.: WO96/14932

PCT Pub. Date: May 23, 1996

(30) Foreign Application Priority Data

Nov. 16, 1994 (JP) .................................................... 6-318995

(51) Int. Cl.⁷ .............................. B01J 31/06; C03C 1/76; B01D 5/00; B32B 3/00

(52) U.S. Cl. .................. 502/159; 502/527.12; 430/531; 430/947; 427/126.1; 427/126.3; 427/126.5; 427/126.6; 427/212; 427/217; 428/312.2; 428/312.6; 428/312.8

(58) Field of Search .............................. 502/159, 527.12; 430/531, 947; 427/126.1, 126.3, 126.5, 126.6, 212, 217; 428/312.2, 312.6, 312.8

(56) References Cited

U.S. PATENT DOCUMENTS

| 4,892,712 | * | 1/1990 | Robertson et al. | 422/186 |
| 5,194,161 | * | 3/1993 | Heller et al. | 210/748 |
| 5,547,823 | * | 8/1996 | Murasawa et al. | 430/531 |
| 5,616,532 | * | 4/1997 | Heller et al. | 502/242 |
| 5,759,948 | * | 6/1998 | Takaoka et al. | 502/325 |
| 5,853,866 | * | 12/1998 | Watanabe et al. | 502/309 |
| 5,981,425 | * | 11/1999 | Taoda et al. | 502/208 |

FOREIGN PATENT DOCUMENTS

| 0633064 | 1/1995 | (EP) . |
| 0684075 | 11/1995 | (EP) . |
| 1-135842 | 5/1989 | (JP) . |
| 5-49861 | 3/1993 | (JP) . |
| 5-253544 | 10/1993 | (JP) . |
| 5-337337 | 12/1993 | (JP) . |
| 8-1010 | 1/1996 | (JP) . |

* cited by examiner

Primary Examiner—Elizabeth D. Wood
(74) Attorney, Agent, or Firm—Jones, Day, Reavis & Pogue

(57) ABSTRACT

A photocatalytic functional material having an excellent photocatalytic activity even by a low temperature heat treatment and having a high mechanical strength of the surface.

The photocatalytic functional material of the present invention comprises a surface layer (a photocatalytic functional layer) containing a photocatalyst, an electron trapping metal and a photodegradation-resistant matrix. Though the major proportion of the photocatalyst ($TiO_2$ particles, and the like) in the photocatalytic functional layer are covered with the photodegradation-resistant matrix (a thermosetting resin, and the like), the electron-trapping metal effectively traps the electrons generated by the photocatalytic reaction, retains positive holes and generates active oxygen species, so that the photocatalytic function such as deodorant and antimicrobial activities can be fully exhibited.

8 Claims, 7 Drawing Sheets

0min-1

2min (200Å>)

20min (2000Å>)

PHOTOCATALYTIC FUNCTIONAL MATERIAL AND METHOD FOR PRODUCING THE SAME

TECHNICAL FIELD TO WHICH THE INVENTION BELONGS

The present invention relates to a photocatalytic functional material having many functions of antimicrobial, preventing smell or stainproof, or decomposition of harmful substances (NOx, and the like) based on the photocatalytic function. Particularly, it relates to a photocatalytic functional material which is prepared by the step of low temperature (about 300° C. or lower).

PRIOR ART

As a method for adding a function of antimicrobial property, stainproof property and deodorizing property, and the like, to the surface of a substrate, a method of forming a thin film of a photocatalyst such as an anatase type titanium oxide, and the like, on the surface of a substrate has heretofore been proposed. As one of the methods, there is a method of kneading anatase type titanium oxide particles with a binder and coating the resulting material to the surface of a substrate and subjecting to heat treatment. As the other method, there is a method disclosed in Japanese Laid-Open Patent Publication (Kokai) No. 253544/1993 filed by the present applicant. This method is a method for producing a plate-shaped member (tile, and the like) which is to constitute a wall surface, floor surface or a ceiling surface of a residential space. In this method, a binder layer is formed on the surface of the plate-shaped member, a photocatalyst fine powder mainly comprising an anatase type titanium oxide is so sprayed on the surface of the binder layer as to expose a part of the powder from the binder layer and adhered thereto, and then, after melting the binder layer by heating within the range of 300° C. or higher and less than 900° C., the binder layer is solidified by cooling.

PROBLEMS TO BE SOLVED BY THE INVENTION

In the above-mentioned method wherein anatase type titanium oxide particles are kneaded with a binder and the material is sprayed to the surface of a substrate, and heat treatment is subjected, almost all the portion of active sites of the photocatalyst particles are covered by the binder so that characteristics by the photocatalyst function such as deodorizing property, and the like, are not sufficient.

Also, according to the method of Japanese Laid-Open Patent Publication (Kokai) No. 253544/1993, deodorizing property, and the like, are good if the material is subjected to heat treatment at 300° C. or higher to less than 900° C. However, by a low temperature heat treatment of less than 300° C., additives in the binder cannot sufficiently be removed so that good deodorizing property, and the like, cannot be obtained. Accordingly, it was difficult to add good photocatalytic functions such as excellent deodorizing characteristics, and the like, to a substrate such as a plastic having poor heat resistance.

Also, according to the method of Japanese Laid-Open Patent Publication (Kokai) No. 253544/1993, when the heat treatment temperature is less than 800° C., the photocatalyst layer forming the surface of a substrate becomes porous with a porosity of 40% or more. Further, it has a structure in which the photocatalyst particles are exposed to the outermost surface so that there is a tendency that the surface is easily peeled off.

The present invention has been accomplished in view of the above circumstances, and an object thereof is to provide a photocatalytic functional material in which a functional material having good photocatalytic activity can be prepared with a low temperature heat treatment, and the surface of the functional material has a high mechanical strength.

MEANS FOR SOLVING THE PROBLEM

In order to solve the above problems, the photocatalytic functional material of the present invention comprises a surface layer (a photocatalytic functional layer) containing a photocatalyst, an electron-trapping metal, and a photodegradation-resistant matrix.

In the present invention, a mechanism of showing photocatalytic functions such as deodorant, antimicrobial activities, and the like, whereas almost all the part of the photocatalyst (particles, and the like) in the photocatalyst functional layer are covered by the photodegradation resistant matrix (a thermosetting resin, and the like) can be supposed as mentioned below.

A photocatalytic reaction on the photocatalyst is considered to proceed as mentioned below. First of all, as the first step, the following reaction in which a photon decomposes to an electron and a positive pore occurs.

$$h\nu \rightarrow h^+ + e^- \quad (1)$$

Next, the generated positive pore reacts with oxygen or water in air or in the layer to form an active oxygen species. The chemical formula in which it is reacted with water is shown below.

$$H_2O \rightarrow H^+ + OH^- \quad (2)$$

$$OH^- + h^+ \rightarrow OH\cdot \quad (3)$$

Here, the generated active oxygen species OH acts on a bad smell component or bacteria to show a deodorizing property or an antimicrobial property.

Provided that, the reaction of the formula (3) competes to the following reaction wherein the positive pore and an electron combine again to return to a photon as shown in the formula (4) below.

$$h^+ + e^- \rightarrow h\nu \quad (4)$$

Subsequently, the case where the photocatalyst particles are exposed to air is considered. In this case, oxygen or water in air can directly react with a photocatalyst so that oxygen or water exists on the photocatalyst particles in addition to positive pores and electrons when the decomposition reaction of light represented by the formula (1) is caused. In this case, the formula (3) and the formula (4) become competition reaction so that active oxygen is formed by the formula (3) with a certain possibility (about 20% or so in the case of an anatase type titanium oxide). According to the action of the active oxygen, a photocatalytic reaction such as deodorization, antimicrobial property, and the like, is to be caused.

Next, the case where the photocatalytic particle is completely covered by a matrix in the state where no electron-trapping metal exist around the surroundings is considered. The photocatalyst is covered by a matrix so that oxygen or water in air cannot directly contact with the photocatalyst. Accordingly, for reacting oxygen or water with a positive pore according to the formula (3), it is necessary to diffuse the oxygen or water in air onto the photocatalyst, diffuse the positive pore to the outermost layer of a layer in which the oxygen or water exists, or cause both of the above diffusion. For this reason, an induction term is caused. On the other hand, an electron has already exist on the photocatalyst when the decomposition reaction of a photon occurs. Thus, before causing the above diffusion, that is, during the induction term, the reaction due to the formula (4) occurs, and thus, the active oxygen generating reaction due to the formula (3) seldom occurs.

From the above matter, when almost all part of the photocatalyst is covered by the matrix in the state that electron-trapping metals are not present at the surroundings, an active oxygen occurs with a certain possibility only at the portion where the photocatalyst is exposed. Thus, an amount of the formed active oxygen is little, whereby sufficient photocatalytic function such as deodorization, antimicrobial property, and the like, cannot be exhibited.

On the other hand, when electron-trapping metals (ion, particle, and the like) exist at the neighbor of the photocatalyst, even when the photocatalyst is completely covered by the matrix, electrons formed by the formula (1) are captured by these metals so that the recombination reaction of the formula (4) hardly occurs whereby positive pores remain for a long period of term without disappearance. Accordingly, even when the photocatalyst is covered by the binder and the active oxygen forming reaction of the formula (3) has an induced term by the reason as mentioned above, the positive pores become difficultly extinct by the formula (4) whereby the active oxygen formation of the formula (3) occurs after the induced term.

According to the above mechanism, since the electron trapping metal is included in the photocatalyst function layer, the photocatalytic functions such as deodorization, antimicrobial property, and the like, are exhibited nevertheless almost all the portion of the photocatalyst is covered by the photodegradation-resistant matrix.

Here, the electron-trapping metal according to the present invention is explained.

In FIG. 12, potential energy levels of valence electron bands and conduction bands of various kinds of semiconductors are shown ("Photocatalyst", Asakura Shoten, p. 54, 1988). When light is irradiated, electrons at the valence electron band are excited to the conduction band, and an electron having a potential energy level at the lower end of the conduction band and a positive pore having a potential energy level at the upper end of the valence electron band are formed. And when the potential energy level possessed by the positive pore is present at the positive side than that of an oxygen formation level $O_2/H_2O$ (+1.22V), the positive pore accepts an electron from $H_2O$ to form $O_2$. Similarly, by forming an active oxygen and subjecting to oxidation decomposition of a gas such as bad smell component(s), and the like, the photocatalytic functions such as deodorization, antimicrobial property, and the like, are exhibited. However, only the positive pores are consumed, the possibility of recombination between the positive pore and the electron becomes high whereby the active oxygen is hardly formed. In order to decrease the possibility of recombination between the positive pore and the electron, it is necessary to effectively capture the electron and the electron is consumed in the other reaction similarly in the positive pore. For making the electron to be consumed, it is necessary that reactions which are in the positive side than the potential energy possessed by the electron and in the negative side than the oxygen forming level shall be caused simultaneously. An effective matter as the reaction agent is a reduction reaction of a metal having a formation level at the positive side than the potential energy level possessed by an electron, i.e., a reduction reaction of an electron-trapping metal ion. Incidentally, the reduced metal is oxidized again by an active oxygen so that all the electron-trapping metal ions are never consumed.

In Table 1, potential energy levels possessed by the electrons of various kinds of photocatalysts, and potential energy levels of typical reactions (reduction reactions) of accepting electrons are shown.

TABLE 1

| Photo-catalyst | Potential energy level/V possessed by electron | Typical reducing reaction | Its formation potential energy level/V | Typical reducing reaction | Its formation potential energy level/V |
|---|---|---|---|---|---|
| $TiO_2$ | −0.1 | $H_2/H^+$ | 0.000 | $Cd/Cd^{2+}$ | −0.40 |
| $SrTiO_3$ | −0.3 | $Cu/Cu^{2+}$ | +0.337 | $Mn/Mn^{2+}$ | −1.18 |
| $WO_3$ | +0.2 | $Ag/Ag^+$ | +0.799 | $Re/Re^{3+}$ | +0.300 |
| $Fe_2O_3$ | +0.3 | $Ru/Ru^{2+}$ | +0.460 | $Ir/Ir^{3+}$ | +1.16 |
| $Bi_2O_3$ | +0.3 | $Pd/Pd^{2+}$ | +0.915 | $Po/Po^{2+}$ | +0.651 |
| ZnO | 0.0 | $Pt/Pt^{2+}$ | +1.19 | $Zr/Zr^{4+}$ | −1.53 |
| $SnO_2$ | +0.2 | $Au/Au^{3+}$ | +1.50 | $Tc/Tc^{2+}$ | +0.400 |
| CdS | −0.8 | $Al/Al^{3+}$ | −1.662 | $In/In^{3+}$ | −0.338 |
| SiC | −1.7 | $Fe/Fe^{2+}$ | −0.440 | $Ga/Ga^{2+}$ | −0.450 |
| CdSe | −0.3 | $Ni/Ni^{2+}$ | −0.228 | $Nb/Nb^{3+}$ | −1.10 |
| $MoS_3$ | 0.0 | $Sn/Sn^{2+}$ | −0.138 | $Tl/Tl^+$ | −0.336 |
| CdTe | −0.8 | $Pb/Pb^{2+}$ | −0.129 | $Cu^+/Cu^{2+}$ | +0.153 |
| | | $Co/Co^{2+}$ | −0.287 | $Sn^{2+}/Sn^{4+}$ | +0.154 |
| | | $Zn/Zn^{2+}$ | −0.763 | $Cu/Cu^+$ | +0.521 |
| | | $Cr/Cr^{3+}$ | −0.67 | $Fe^{2+}/Fe^{3+}$ | +0.771 |
| | | $Mo/Mo^{3+}$ | −0.20 | $V^{2+}/V^{3+}$ | −0.255 |
| | | $Ge/Ge^{2+}$ | 0.00 | | |

From Table 1, when the photocatalyst is titanium oxide, the potential energy level possessed by the electron is −0.1 V, so that, in this case, as an electron-trapping metal ion, a metal having a formation level at the positive side than the above, i.e., Cu, Ag, Ru, Pd, Pt, Re, Ir, Po, Fe, Sn, and the like, can be suitably utilized.

From this consideration, it can be considered that the electron-trapping metal has a large effect when it is added in a layer in the state of an ion. As a suitable value of the amount to be added, it is sufficient with an amount of 0.006% by weight in at least the uppermost layer (an ultraviolet ray reaching depth) of the layers from the experimental facts (Example 2). Here, the ultraviolet ray reaching depth means a depth in which the ultraviolet ray is capable of reaching without absorbed by the surface layer.

An ultraviolet ray absorbing coefficient α of a semiconductor band is represented by $$\alpha \approx (E-E_g)^{1/2}$$

when a wavelength of light has a slightly larger energy E (=h/λ, wherein h is a Planc's constant and λ is a wavelength of light) than a forbidden width. Here, Eg is a forbidden band width of the semiconductor band.

A spectral reaching depth d in the semiconductor band is represented by a reciprocal of α. Accordingly, it is represented by $$d \approx (h/\lambda - E_g)^{-1/2}.$$

The surface layer of the present invention comprises a photocatalyst which is a semiconductor, an anticorrosive matrix and metal. Among these, when ultraviolet ray absorption by the photocatalyst is considered to be large, and when a volume ration of the photocatalyst in the surface layer is made x, the ultraviolet ray reaching depth dv is an amount represented by $$dv \approx x^{-1/3} \cdot (h/\lambda - E_g)^{-1/2}.$$

In Table 2, forbidden band widths of representative photocatalysts are shown.

TABLE 2

| Photocatalyst | Forbidden band width (ev) | Photocatalyst | Forbidden band width (ev) |
| --- | --- | --- | --- |
| $TiO_2$ | 3.0 | CdTe | 1.4 |
| ZnO | 3.2 | $WO_3$ | 2.8 |
| $SrTiO_3$ | 3.2 | $Fe_2O_3$ | 2.3 |
| CdS | 2.4 | $MoS_3$ | 1.8 |
| GaP | 2.3 | $Bi_2O_3$ | 2.6 |
| SiC | 3.0 | $SnO_2$ | 3.5 |
| CdSe | 1.7 | InP | 1.3 |

In the present invention, the shape of the photocatalyst may be either a particulate, a membrane or a solid solution. Among these, representative one is inorganic crystalline particles having a photocatalytic function. Incidentally, in the photocatalytic functional layer, a minute amount of particles having no photocatalytic function may be contained in addition to the above particles. For example, there may be mentioned a filler such as metal or an oxide thereof to be added for increasing surface smoothness, and the like.

The degree of crystallinity of the photocatalyst particle is a degree in which a maximum peak of the crystal is detected when the photocatalyst particle peeled off from the photocatalyst functional layer is measured by the powder X-ray diffraction under the conditions of 50 kV–300 mA.

As an example of the photocatalyst particles, there may be mentioned oxide and non-oxide semiconductors such as $TiO_2$, ZnO, $SrTiO_3$, $Fe_2O_3$, CdS, CdSe, $WO_3$, $FeTiO_3$, GaP, GaAs, GeAs, $RuO_2$, $MOS_3$, $LaRhO_3$, $CdFeO_3$, $Bi_2O_3$, $MOS_2$, $In_2O_3$, CdO, $SnO_2$, SiC, InP, and the like. Among these, $TiO_2$, ZnO, $SrTiO_3$, CdS, CdSe, GaP, $MOS_3$, Sic, and the like have the position of the conductive band positioning at higher than the hydrogen generating potential and the upper end of the valence electron band positioning at lower than the oxygen generating potential when it is designated by a band model, and thus, when a light with a wavelength having an energy higher than the band gap is irradiated, an active oxygen is generated. Thus, they are excellent in the points that they show a deodorant function, an antimicrobial function or an antistain function due to decomposition of an organic compound by oxidation. Also, in $Fe_2O_3$, $WO_3$, $SnO_3$ and $Bi_2O_3$, when these are made fine particles with a particle size of 10 to 100 A or so, the position of the conductive band is moved to an upper portion so that it can be considered to show a deodorant function, an antimicrobial function or an antistain function same as above. Among these, $TiO_2$ (anatase type, rutile type), $Fe_2O_3$, ZnO, $SnO_2$, and the like are available in the point that starting materials are obtained cheaply, and further an anatase type $TiO_2$ and $SnO_2$ are more preferred in the point that fine particles having higher activity can be easily obtained. The inorganic particles having photocatalytic function of the present application may be used either any one kind of these or in combination of two kinds or more by mixing.

In the present invention, the photodegradation-resistant matrix comprises an inorganic material hardly decomposable by light and a resin. In this resin, a resin in which a side chain is decomposed by light but a main chain is not decomposed is included.

Examples of the photodegradation-resistant matrix are as mentioned below.

Inorganic materials:

Silica, a silicic acid compound, glass, light-transmittance alumina, glaze, and the like. It is preferred to have a light-transmittance.

Hardly decomposable resins:

A tetrafluoroethylene resin, a tetrafluoroethylene hexafluoropropylene copolymer, a tetrafluoroethylene hexafluoropropylene-vinylidene fluoride copolymer, an acrylic silicon resin, and the like.

Resins in which a side chain is partially decomposed but a main chain is not decomposed:

A siloxane resin represented by the average compositional formula: $R^1 mSi(OR^2)n(OH)pO(4-m-n-p)/2$ ($R^1$ is an organic group, $R^2$ is an alkyl group, $0 \leq m<4$, $0 \leq n<4$, $0<m+n<4$, $0 \leq p<4$, $0<m+n+p<4$). $R^1$ or $R^2$ portion is decomposed by photooxidation.

Silazane resin and the like.

As the thermosetting resin, a silicon resin, a fluoride resin, and the like are mentioned, and a colored one may be used.

Also, a photocuring resin may be utilized in place of a thermosetting resin. Here, the photocuring resin means a resin which cures by irradiation of light including ultraviolet light. Incidentally, the photocuring resin has a merit of requiring no heat treatment so that it is particularly advantageous in the case of a resin basic material having no thermal resistance.

An electron-trapping metal (particles and the like) may basically exist in a state of mixing with photocatalytic particles or a thermosetting resin, or may be exposed at the uppermost layer of the functional material.

Here, by so existing the metal particles as to contact with the air outside, a reaction based on the photocatalytic function such as a deodorant reaction and the like can proceed rapidly according to the catalytic function by the metal particles themselves at irradiation of light. For example, when a decomposition reaction by oxidation of a bad odor gas is mentioned as an example, the bad odor gas is adsorbed to the metal particles exposed to the surface, and then an active oxygen formed based on the photocatalytic function and the bad odor gas occur a plane reaction on the surface of the photocatalytic functional layer to decompose the bad odor gas. This reaction (cycle) continuously proceeds to promote the reaction, and the photocatalyst and the metal particles cause no chemical change in this cycle. Accordingly, this reaction is a catalytic reaction.

Also, by contacting the metal particles with the air outside, even when light is not irradiated, a function possessed by the metal particles can be expected. That is, the metal particles (copper and the like) have a function of adsorbing a bad odor gas such as methyl mercaptane and the like so that they have a function of deodorant and the like for a certain period of time. However, in this case, deodorant is effected by adsorption of the bad odor component so that the adsorbed amount exceeds a saturated amount for adsorption, the effect is lost. Therefore, when it is used for a long period of term, it is preferred to use photoirradiation in combination. Further, in a metal such as silver and the like, the metal itself has a certain degree of antifungal activities so that it is preferred.

In the present invention, it is preferred that a mixing ratio (a resin weight/(a resin weight +a photocatalyst weight)) of a thermosetting resin and a photocatalyst in a photocatalytic function layer is 5 to 80%. Further, the ratio is more preferably 10 to 50%. This is because, if the ratio is 5% by weight or less, abrasion resistance of the surface is not sufficient, while if it is 80% by weight or more, an absolute amount of the photocatalyst particles is a little so that the photocatalytic function is not sufficient and there is a fear of not obtaining a sufficient odor-proof and antifungal activities as a photocatalytic functional material. When the ratio is 10% or more, the abrasion resistance is more excellent and it is 50% or less, the antifungal activities (R30) are good.

The photocatalytic functional material which is one embodiment of the present invention comprises having a substrate, and a photocatalytic functional layer fixed on the substrate surface and containing a photocatalyst, an electron-trapping metal, and a photodegradation-resistant matrix.

Here, the material of the substrate may be basically any material such as a chinaware, ceramics, enamel, metal, glass, thermosetting resin, thermoplastic resin or a composite material thereof. The shape of the substrate may be any shape and may include a simple shape material of a spherical, a columnar, a cylindrical, a plate material such as a tile, wall material, floor material and the like, or a complex shape material of hygiene earthenware, a washstand, a bathtub, tableware, a pan and the like.

The thickness of the photocatalytic functional layer is preferably 0.1 to 20 $\mu$m, and more preferably 0.1 to 5 $\mu$m, most preferably 0.2 to 1 $\mu$m. If it is less than 0.1 $\mu$m, there is a tendency that a sufficient photocatalytic activity is now shown. If it exceeds 5 $\mu$m, surface gloss of the substrate may be sometimes impaired. If it exceeds 20 $\mu$m, crack is likely caused in the layer.

Here, the film thickness is a thickness of a portion in which an element(s) inherently contained in a particle having photocatalytic activity is present when elemental analysis of the sectional surface of the substrate is carried out by EDX, and the like.

This photocatalytic functional layer may be formed directly on the substrate, or may be formed via an intermediate layer comprising a binder. A layer comprising a binder has a higher film strength and excellent in adhesion than a film comprising a mixture of a photodegradation resistant matrix and photocatalyst particles so that, by interposing such an intermediate layer, the substrate and the photocatalytic functional layer can be firmly bound and peeling resistance can be improved.

It is not necessary to use the same kind of the intermediate layer as the matrix (resin and the like) in the photocatalytic functional layer. Accordingly, for example, when the photodegradation-resistant matrix is made a resin having a large photodegradation resistance, a resin to be added may be formed by a resin having a slightly inferior in photodegradation resistance or a resin with a low cost, or a colored resin may be used to provide a designing value. Also, by interposing such an intermediate layer, an amount of the photodegradation-resistant matrix (a thermosetting resin and the like) in the photocatalytic functional layer can be reduced and a distribution of the photocatalyst particles can be concentrated to the outermost surface or a neighbour thereof so that photocatalytic activity can be more easily shown, and functions of antimicrobial activity, deodorant activity and the like are improved.

Here, the binder is preferably those which do not deteriorated when contacting with the photocatalyst in the photocatalytic functional layer. Examples of the binder are as follows.

A siloxane resin, a silazane resin, a fluorine resin (a tetrafluoroethylene resin, a tetrafluoroethylene-hexafluoropropylene copolymer, a tetrafluoroethylene-hexafluoropropylene-vinylidene fluoride copolymer, a flurovinyl resin, a fluorovinylene resin, a chlorotrifluoroethylene resin, a vinyl ether-fluoroolefin copolymer, a vinyl ester-fluoroolefin copolymer and the like) an acrylic-silicon resin, a silica type glass, a boron type glass, glaze, flit, and the like.

The photocatalytic functional film of the present invention comprises a substrate in a film state having flexibility, a photocatalyst and an electron-trapping metal supported on the substrate surface, and a photocatalytic functional layer containing a photodegradation-resistant matrix.

For example, this film is used when functions such as odor-proof, antimicrobial activities and the like are added to building materials comprising a laminated steel plate such as a vinyl chloride coated steel plate, and the like. The vinyl chloride coated steel plate is usually prepared by subjecting on a steel plate to a melt zinc plating, and after chemical treatment (chromate treatment on a nickel plating), a laminate treatment is carried out. The laminate treatment is subjected by repeating the steps of, after coating an adhesive, adhering various kinds of films such as vinyl chloride film and the like separated prepared. Accordingly, when a odor-proof and antimicrobial film can be prepared, a deodorant and antimicrobial function can be provided to building materials comprising a laminated steel plate by a laminating treatment without requiring specific manufacturing lines.

As the preparation process of the film, there may be mentioned, for example, a method of passing a liquid material in which a photocatalyst, a thermosetting resin and an electron-trapping metal are dispersed between hot plates provided at positions opposed to each other with a predetermined distance and is slightly inclined to downwards from the liquid material discharging portion.

The paint composition of the present invention contains a photocatalyst, an electron-trapping metal, and, a photodegradation-resistant matrix in a fluid state. When the functions such as deodorant, antimicrobial activities and the like are desired to be newly added to, for example, already executed tiles, and the like in situ, this paint composition is used. Solution A in which main agents of a photocatalyst and a two-pack type thermosetting resin, and electron-trapping metals are dispersed, and Solution B containing a curing agent of the thermosetting resin are prepared and coating is carried out by mixing these solutions in situ. Here, the thermosetting resin is a room temperature curing type, it can be widely used regardless of outdoors or indoors.

One example for preparing the paint composition is as follows.

Preparation of Solution A is, for example, to prepare a photocatalyst sol, a main agent (for example, silica sol) of a thermosetting resin and an electron-trapping metal (a solution in which an aqueous copper acetate solution is photoirradiated), and they are mixed.

As Solution B, a curing agent which can cause curing polymerization reaction with the main agent in Solution A is prepared (for example, trimethoxymethylsilane when the main agent in Solution A is a silica sol).

Next, a preparation method of the photocatalytic functional material of the present invention is explained.

Basic procedures are carried out as follows.

①Step of forming an intermediate layer comprising a binder on the surface of a substrate ②Step of preparing a liquid material containing a photocatalyst, an electron-trapping metal, and, a thermosetting resin ③Step of applying said liquid material to the surface of the substrate to which the above intermediate layer is formed ④Step of curing said liquid material applied onto the surface of the substrate by heating.

In the above-mentioned Step ②, a liquid material containing a main agent of a thermosetting resin is prepared, then, a curing agent is added to said liquid material, and then, the mixture may be applied to the surface of the substrate to which the above-mentioned intermediate layer is formed.

Also, in the above steps, by using a photocurable resin is used in place of the thermosetting resin, light containing ultraviolet ray may be irradiated in place of subjecting the substrate to which the liquid material is coated to heat treatment.

By employing such a constitution, it is not necessarily to expose the photocatalyst (particles, and the like) to contact with outer air. Thus, when the material is coated onto the substrate, it is not necessary to separately carry out the step of coating the photocatalyst particles and the step of coating the photodegradation-resistant matrix, and it is possible to coat a material once by, for example, mixing and kneading the photocatalyst particles and the binder. Accordingly, simplification of the steps can be realized to reduce manufacturing costs.

Another embodiment of a method for preparing the photocatalytic functional material of the present invention comprises the steps including a step of preparing a sol containing photocatalyst particles, a step of mixing said sol with a solution containing ions of an electron-trapping metal, a step of obtaining a liquid material by adding a thermosetting resin to said mixture, a step of applying said liquid material to the surface of a substrate, and a step of curing said liquid material applied to the surface of the substrate by heating.

Here, the photocatalyst particles are desirably monodispersed. Thus, for example, in the case of an anatase type titanium oxide, its isoelectric point is pH 6.5 so that they are dispersed at acidic or alkaline state. At this time, in order to improve dispersibility, a dispersant (a peptizing agent) or a surfactant, or a surface treating agent may be added. A solvent to be used in the photocatalyst sol liquor may be basically any material. In general, water or ethanol is well used.

In the step of mixing the photocatalyst particle sol and the metal-containing solution, a metal-containing solution adjusted the pH thereof to substantially the same as that of the photocatalyst particle sol liquor is added to the photocatalyst particle sol liquor. The reason why the pH of the metal-containing solution is made substantially the same as that of the photocatalyst particle sol liquor is to maintain monodispersibility of the photocatalyst particle sol by not so changing a zeta potential in the liquor of the photocatalyst sol. Here, the metal-containing solution means a solution comprising an elute containing a metal which can trap electrons when an electron and a positive pore are formed by irradiating light to photocatalyst particles, and a solvent. More specifically, as an elute, there may be mentioned silver nitrate, copper acetate, copper sulfate, cuprous chloride, cupric chloride, copper carbonate, ferrous chloride, ferric chloride, chloroplatinic acid, palladium chloride, and the like. Also, as the solvent, water, ethanol, propanol, and the like may be used, but it is desirable to use the same kinds of the solvent as that of the photocatalyst sol, if possible.

In the preparation method of the present invention, a step of diluting a suspension of a mixture of the sol and the resin with a solvent may be added. The diluent to be used here is to be added for the purpose of lowering viscosity (0.1 to 10 cps or so) and making coating of the material to the substrate easy. It may be basically any material so long as the purpose can be accomplished. For example, ethanol, propanol, water, and the like may be mentioned.

Here, a liquid material which hardly causes aggregation of the suspension can be formed by carrying out a step of adding a thermosetting resin to a mixture, a step of diluting the suspension of the mixture comprising the above mentioned sol and the resin with a solvent, and a step of adding a curing agent to the above-mentioned diluted solution in this order.

A drying step may be inserted between the step of coating the liquid material to which a curing agent is added to a substrate, and the step of curing the liquid material by heating.

A method of coating liquid material to which a curing agent is added to a substrate may be used basically any method, but a spray coating method or a roll coating method is relatively simple and easy.

The curing step by heating may be carried out at a low temperature of less than 100° C. for a long time or may be carried out at 100° C. or more and less than a heat resistant temperature of the substrate and the thermosetting resin for a short time. In general, the photocatalyst particle has a larger specific gravity than that of the thermosetting resin. Thus, it is desired to carry out the heat treatment at 100° C. or more and less than the heat resistant temperature of the substrate and the thermosetting resin for a short time since there is no fear of burying the photocatalyst particles at the lowermost portion of the substrate surface.

The method of supporting the electron-trapping metal to the photocatalytic functional layer may be mentioned as follows in addition to the method of mixing the photocatalyst or the thermosetting resin with said metal.

That is, on the substrate, a mixed layer of the photocatalyst and the resin is formed. Thereafter, a liquid containing the electron-trapping metal is applied (coating and the like) onto the mixed layer and light containing ultraviolet ray is irradiated to the coated surface to support the metal to the surface of the substrate.

Here, as the metal-containing solution, those as mentioned above can be utilized. As the solvent of the containing solution, particularly when ethanol is used, it is preferred in the point of contributing to improvement in productivity of the metal coating step since drying speed is fast as compared with water, the point of capable of improving supporting efficiency of metal since surface tension is low as compared with water and wettability is good, and the point of harmless different from other volatile solvent such as ether, acetone, methanol and the like.

The step of supporting the metal to the surface of the support by irradiating light containing ultraviolet ray to the metal coated surface may be carried out after drying the coated metal-containing solution. By employing such a step, supporting efficiency of the metal can be improved as compared with the case where no drying is carried out.

A light source of irradiating light containing ultraviolet ray may be any one having an ultraviolet intensity with a degree which does not impair the substrate or the resin. For example, there may be used a fluorescent light, a BLB lamp, an ultraviolet lamp, a xenone lamp, a mercury lamp, a sun light and the like. However, when the irradiation time takes several hours, the ultraviolet intensity is preferably less than 1.7 mW/cm$^2$. Accordingly, in this case, the mercury lamp, and the like are generally not suitable.

The method of irradiating light containing ultraviolet ray is preferably carried out by so providing light as to vertically incident upon a sample. This is because irradiation efficiency of light is good.

An irradiation time of light containing ultraviolet ray is suitably several seconds to several hours or so. If it is too short, the above-mentioned metal is not sufficiently reduced nor supported, while it is too long, an electron-trapping effect of the above-mentioned metal particles is weakened, and when a light source with a large ultraviolet intensity is used, there is a fear that the substrate or the resin being impaired.

Another embodiment of a method for preparing the photocatalytic functional material of the present invention comprises the steps including a step of preparing a sol containing photocatalyst particles, a step of mixing said sol with a solution containing ions of an electron-trapping metal, a step of irradiating ultraviolet ray to said mixture to reduce and support said metal to the surface of the photocatalyst particles, a step of obtaining a liquid material by adding a thermosetting resin to said mixture, a step of applying said liquid material to the surface of a substrate, and a step of curing said liquid material applied to the surface of the substrate by heating.

That is, between the step of mixing the photocatalyst sol and the solution containing ions of an electron-trapping metal, and the step of adding a resin, the step of irradiating ultraviolet ray to said mixture to support the metal to the surface of the photocatalyst particles is inserted. Here, the light-irradiation step is preferably carried out by stirring the solution. By employing such a constitution, metals can be easily attached to the sol of the substance having a photocatalytic activity without exception. As the stirring device at this time, there may be used, for example, an ultrasonic vibrator, a stirrer, a homogenizer, and the like.

As a light source of irradiating light containing ultraviolet ray, there may be utilized those as mentioned above. A method of irradiating light containing ultraviolet ray is also not basically limited, but firstly, it is preferably irradiated from the upper portion of the apparatus. This is because absorption of the ultraviolet ray by the apparatus is little. Secondly, the distance between the light source and the apparatus is preferably several cm to several 10 cm or so. This is because if it is too close, there is a fear of drying the upper surface of the sample solution due to heat emitted by the light source, while if it is too far, intensity is lowered. The irradiation time is different depending on the intensity of the light source, but when irradiation is carried out for several seconds to several 10 minutes or so, metals are firmly adhered to the photocatalyst particles.

EXAMPLES

Example 1 (Copper, coating method)

To a titanium oxide sol (elute concentration 10% by weight, nitric acid dispersion type, pH 0.8, TA15 available from Nissan Chemical Co.) having an average particle size of 0.01 μ was added a silica sol (elute concentration 13% by weight, Gulaska A available from Nippon Synthetic Rubber) as a main agent, and the mixture was diluted with propanol. Thereafter, trimethoxymethylsilane (Gulaska B available from Nippon Synthetic Rubber) was added as a curing agent, and the solution was coated to an aluminum substrate with a size of 10 cm square. Thereafter, it was heated to 150 ° C. to solidify and then cooled.

Figure 10A:
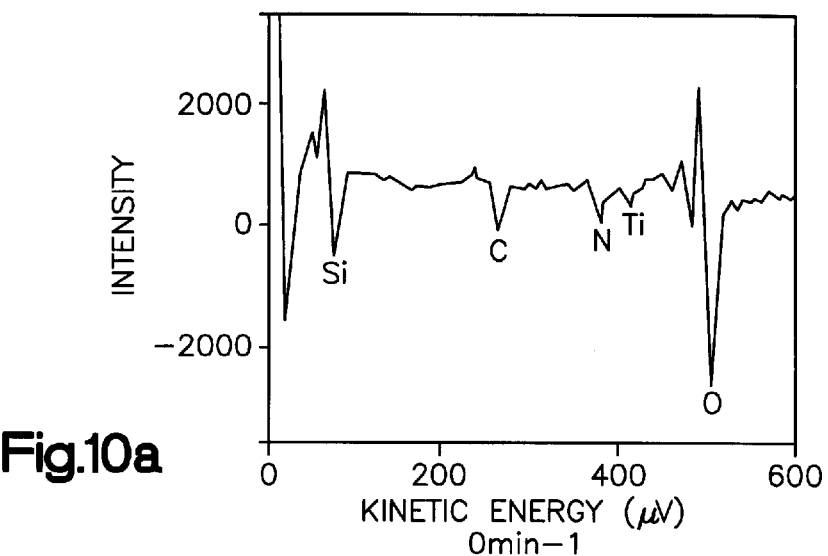
FIG. 10 is a drawing showing the results of Auger analysis at the surface of the sample in Example 1.
Figure 10B:
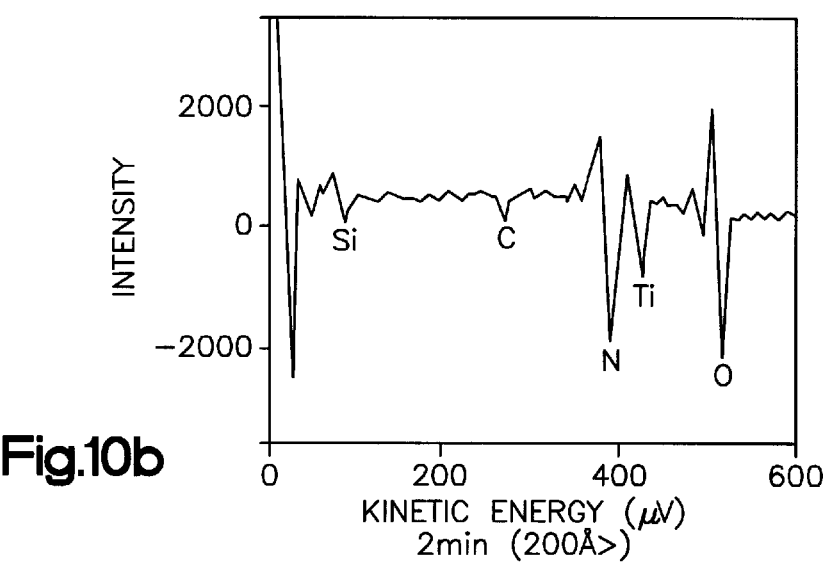
Figure 10C:
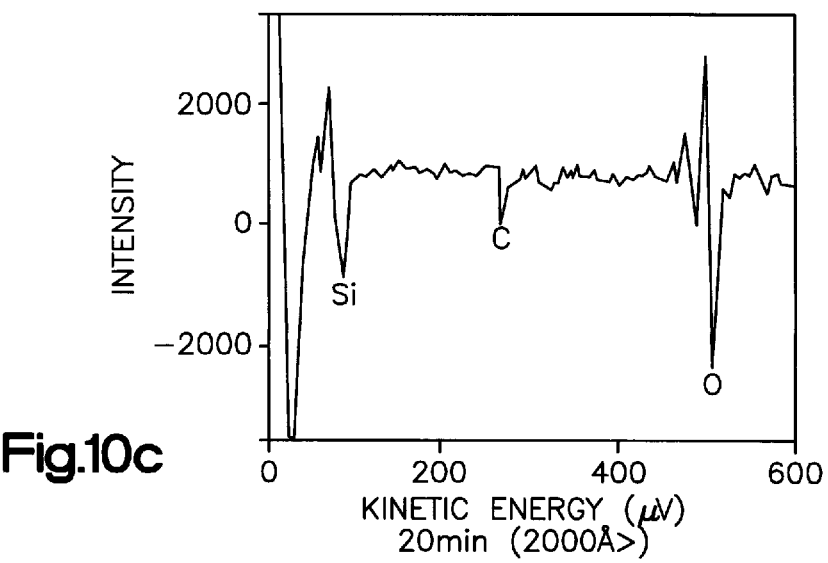

Results of Auger analysis of the sample surface at this stage is shown in FIG. 10. (a) represents the analytical results at the uppermost layer, and (b) and (c) each represent the analytical results at the inner portions of 200 Å and 2,000 Å from the surface layer, respectively. From FIG. 10, a titanium element can hardly be observed at the upper-most layer, and when the matrix layer is formed by curing polymerization reaction as in the present invention, it was found that the titanium oxide particles exist at the uppermost layer with a substantially not exposed state. Accordingly, in the case of the present invention, different from the usual surface reaction catalyst other than the photocatalyst, an electron-trapping activity is added by addition of a metal whereby activities of deodorant and decomposing gas and the like are shown even when the catalyst is not exposed at the surface.

Next, on the surface of the cured catalyst-resin mixture layer was coated an aqueous copper acetate (molecular weight 199.65), and then, a BLB lamp with 0.5 mW/cm$^2$ was irradiated for 30 seconds to obtain a sample.

The film thickness of the thus obtained photocatalytic functional layer was about 0.8 μ and the crystal system of titanium oxide was anatase. A weight ratio of silica sol and trimethoxymethylsilane was made 3:1. Also, an amount of copper supported to the surface of the sample was made 0.5 to 3 $\mu$/cm$^2$ (correspond to 0.006 to 0.04% by weight based on the weight of the solid components of titanium oxide and the resin).

As for the resulting sample, deodorant activity and peeling resistance were evaluated. As for the evaluation of deodorant activity, by the method shown below, methyl mercaptane was used as a bad odor gas and evaluation was carried out by measuring R30'.

R30'is an evaluation index of deodorant activity obtained as mentioned below. First, a methyl mercaptane gas with a concentration of 3 ppm at dark was injected into 11 liters of a glass apparatus in which a sample was charged, and the sample was allowed to stand for one day to sufficiently adsorb the gas to the sample. Next, light was irradiated (a light source (a BLB lamp 4W) was arranged at a distance of 8 cm from the sample) to the sample to photodecompose the adsorbed gas. Next, a methyl mercaptane gas was newly injected into the apparatus to become an initial concentration of 3 ppm, and change in concentration after 30 minutes at dark was measured.

As for peeling resistance, sliding abrasion using a plastic eraser was carried out, and change in appearance was compared and evaluated. Evaluation standard is shown below.

⊚: No change against 40 times of go and return

O: Scratch is occurred by sliding with 10 times or more and less than 40 times and the photocatalyst containing layer is peeled off Δ: Scratch is occurred by sliding with 5 times or more and less than 10 times and the photocatalyst containing layer is peeled off X: Scratch is occurred by sliding with less than 5 times and the photocatalyst containing layer is peeled off The results are shown in FIGS. 1 and 2 with black points.

Figure 1:
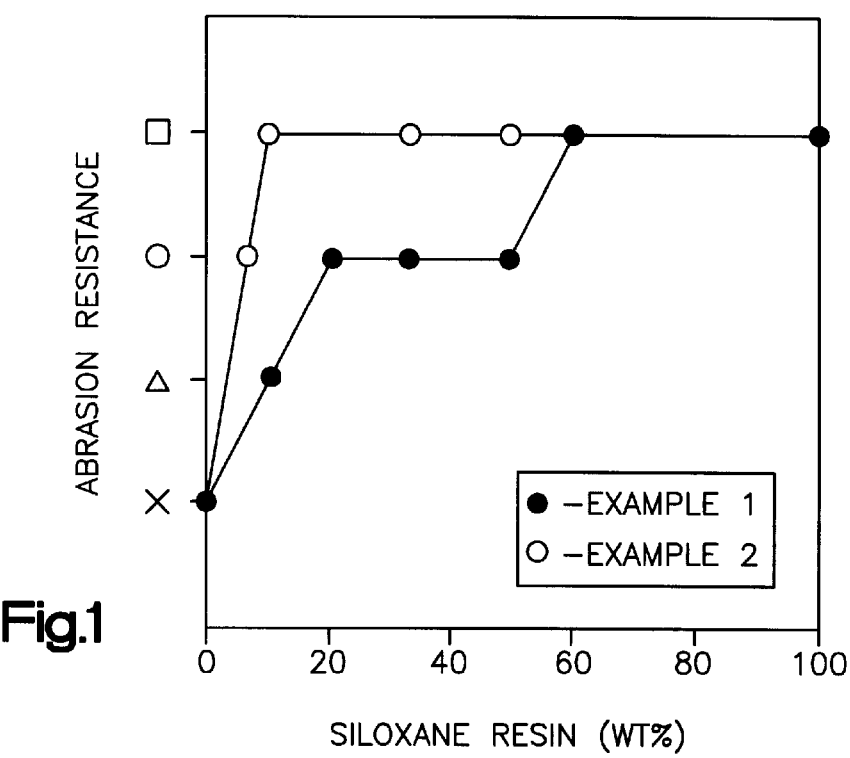
FIG. 1 is a graph showing the relationship between the added amount of a thermosetting resin and abrasion resistance in Examples 1 and 2.

As shown in FIG. 1, when a layer comprising only photocatalytic particles (anatase particles) is formed on the surface of the substrate (resin 0%), peeling resistance was X, but when 20% by weight or more of the resin is added based on the total weight of the photocatalytic particles and the resin, peeling resistance was improved to 0. Further, when 60% by weight or more of the resin is added based on the total weight of the photocatalytic particles and the resin, peeling resistance was improved to ⊚.

Figure 2:
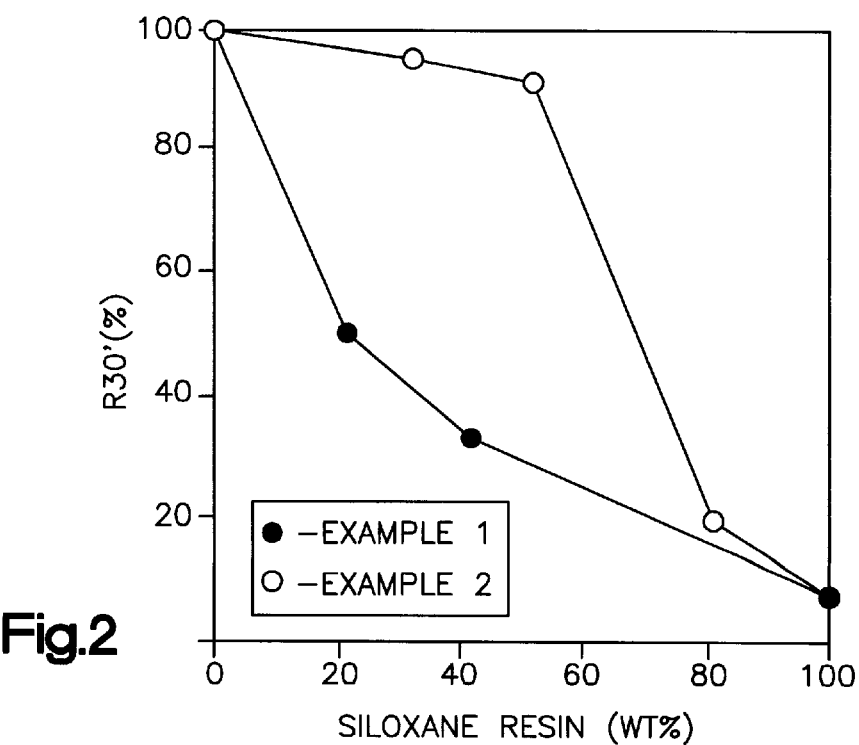
FIG. 2 is a graph showing the relationship between the added amount of a thermosetting resin and photoactivity in Examples 1 and 2.

As shown in FIG. 2, in deodorant activity, in the case of the resin (100%) alone, it shows only a value with R30' of 10% or less which is considered by the adsorption activity due to copper. However, when the photocatalyst particles are added in an amount of 80% by weight or more (the resin amount of 20% by weight or less), the deodorant activity became good with exceeding 50%.

EXAMPLE 2

Having An Intermediate Layer, Copper, Coating Method)

A liquid material in which silica sol and trimethoxymethylsilane were mixed with a weight ratio of 3:1 and an elute concentration was made 20% by weight was coated to an aluminum substrate with a size of 10 cm square and dried at 150° C. to form a resin layer (an intermediate layer) with a film thickness of about 5 $\mu$m.

Thereafter, onto the surface of the intermediate layer, a photocatalytic functional layer comprising titanium oxide, a resin and copper was formed in the same manner as in Example 1. The film thickness of the photocatalytic functional layer was made about 0.3 $\mu$m.

As for the resulting sample, deodorant activity and peeling resistance were evaluated. The results are shown in FIGS. 1 and 2 with white-blanked points.

As shown in FIG. 1, by interposing the siloxane resin layer between the substrate and the photocatalytic functional layer, peeling resistance became O by addition of 5% by weight or so of the matrix resin based on the total weight of the photocatalyst particles (anatase particles) and the matrix resin. Further, by addition of 10% by weight or more of the matrix resin based on the total weight of the photocatalyst particles and the matrix resin, peeling resistance became ⊚.

As shown in FIG. 2, when the photocatalyst particles are added in an amount of 50% by weight or more, deodorant activity became 90% or more whereby good results are shown.

In conclusion, when a siloxane resin layer is interposed at an intermediate portion, it was found that the abovementioned two characteristics showing contradictory tendency to the ratio of both materials in the mixed layer comprising the photocatalyst particles and the resin can be easily harmonized. It was found that good results are shown particularly when the amount of the matrix resin based on the total weight of the photocatalyst particles and the matrix resin is 5% by weight or more and less than 80% by weight, preferably 5% by weight or more and 50% by weight or less.

EXAMPLE 3

Copper, Mixing, Method, Intermediate Layer Present

First, a resin layer with a film thickness of about 5 $\mu$m was formed in the same manner as in Example 2.

Next, an aqueous copper acetate (molecular weight 199.65) solution and the titanium oxide sol used in Example 1 were mixed. Next, the silica sol used in Example 1 was added to the mixture, the resulting mixture was diluted with ethanol and then, trimethoxymethylsilane used in Example 1 was added to obtain a liquid material. This liquid material was coated to an aluminum plate with a size of 10 cm square, and dried at 150° C. to form a photocatalytic functional layer with a film thickness of about 0.3 $\mu$m whereby a sample was obtained. Here, the weight ratio of the silica sol and trimethoxymethylsilane was made 3:1. Also, crystal system of the titanium oxide was anatase. The weight of copper acetate solid component based on the total weight of the resin weight and the photocatalyst weight was made 2%.

As for the resulting sample, deodorant activity, peeling resistance and surface hardness were evaluated.

The surface hardness was evaluated by scratching the surface of a member with a pensil having a different hardness from 6B to 9H and judged by the hardness of which scratch is occurred.

Figure 3:
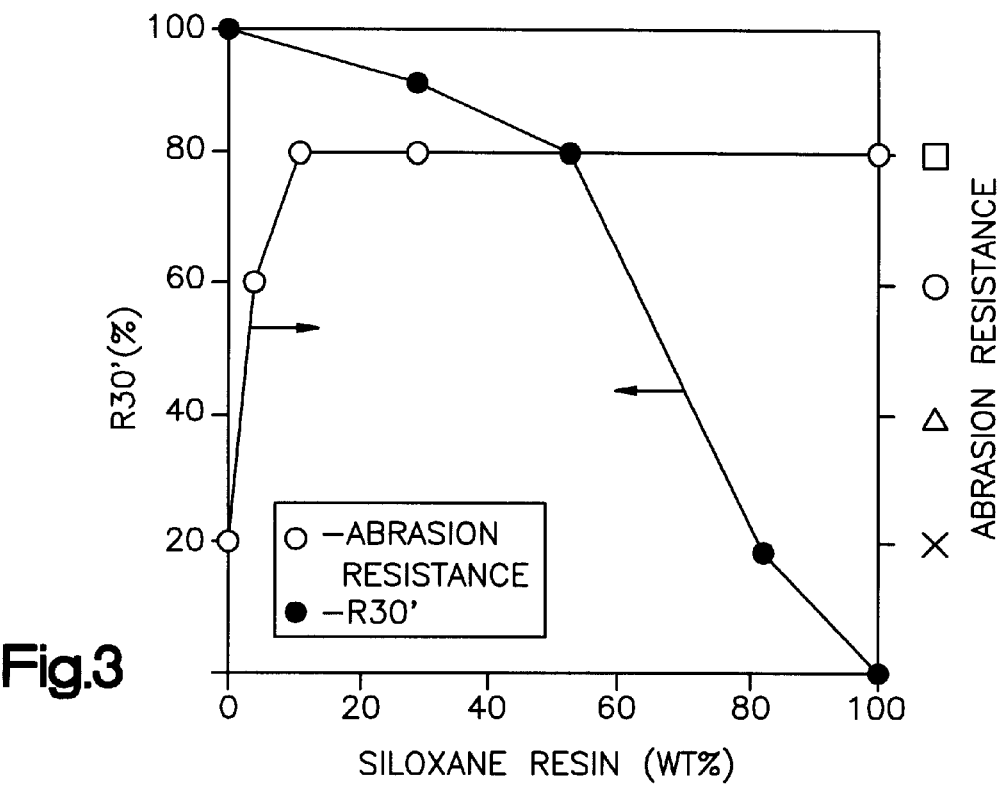
FIG. 3 is a graph showing the relationships between the added amount of a thermosetting resin, and abrasion resistance and photoactivity in Example 3.

Results regarding the deodorant activity and peeling resistance are shown in FIG. 3. In this case, in the same manner as in Example 2, by interposing the siloxane resin layer at an intermediate portion, peeling resistance became O by addition of 5% by weight or so of the matrix resin based on the total weight of the photocatalyst particles and the matrix resin. Further, by addition of 10% by weight or more of the matrix resin based on the total weight of the photocatalyst particles and the matrix resin, peeling resistance became ⊚. Also, as for deodorant activity, when the photocatalyst particles are added in an amount of 50% by weight or more, it became 80% or more whereby good results are shown. In conclusion, in the same manner as in Example 2, it was found that good results are shown when the amount of the matrix resin based on the total weight of the photocatalyst particles and the matrix resin is 5% by weight or more and less than 80% by weight, preferably 5% by weight or more and 50% by weight or less.

Figure 11:
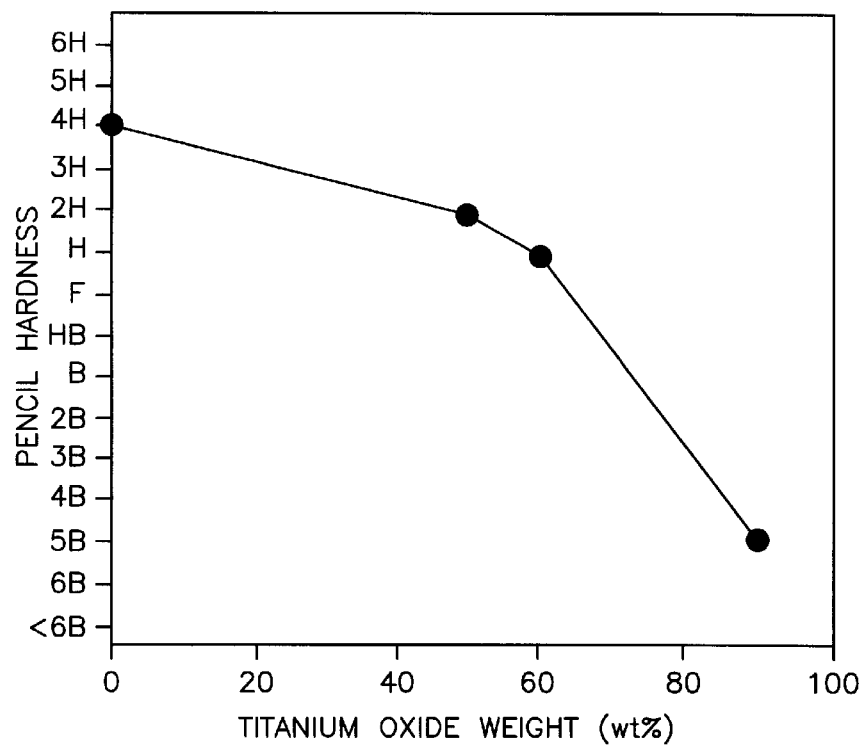
FIG. 11 is a graph showing the relationship between the weight ratio of titanium oxide and the surface hardness of the photocatalyst functional layer in Example 3.
Figure 12:
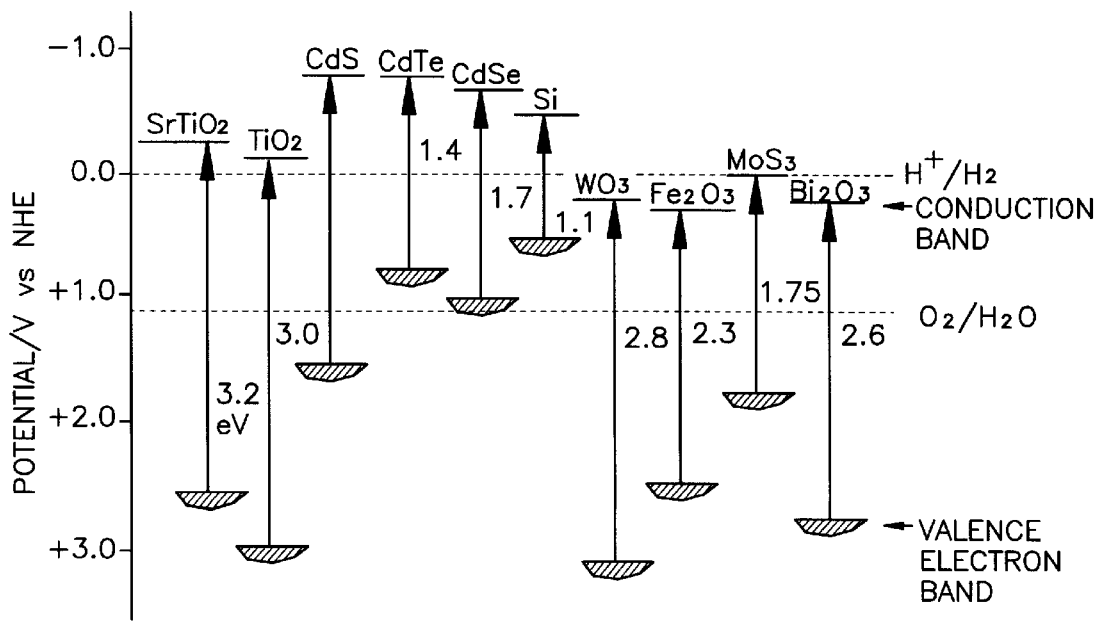
FIG. 12 is a drawing showing the relationship between the band structure of the photocatalyst and an energy level.

Also, results regarding the surface hardness are shown in FIG. 11. When the amount of the matrix resin based on the total weight of the photocatalyst particles and the matrix resin in the mixed layer comprising the photocatalyst particles and the resin is 10% by weight or more, the surface hardness became a sufficient hardness of 5B or more, and when it is 60% by weight or more, the surface hardness became a more sufficient hardness of H or more.

EXAMPLE 4

Copper, Mixing Method, Intermediate Layer Present, Photoirradiation at Mixing)

First, a resin layer with a film thickness of about 5 μm was formed on an aluminum substrate with a size of 10 cm square in the same manner as in Example 2.

Next, the aqueous copper acetate solution and the titanium oxide sol used in Example 3 were mixed and a BLB lamp with 0.5 mW/cm$^2$ was irradiated for 15 minutes while stirring. Thereafter, the silica sol used in Example 1 was added, and after the resulting mixture was diluted with ethanol, trimethoxymethylsilane used in Example 1 was added to obtain a liquid material. This liquid material was coated on the resin layer of the above-mentioned substrate, and dried at 150° C. to form a photocatalytic functional layer with a film thickness of about 0.3 μm whereby a sample was obtained. Here, the weight ratio of the silica sol and trimethoxymethylsilane was made 3:1. Also, crystal system of the titanium oxide was anatase. The weight of copper acetate solid component based on the total weight of the resin weight and the photocatalyst weight was made 2%.

Figure 4:
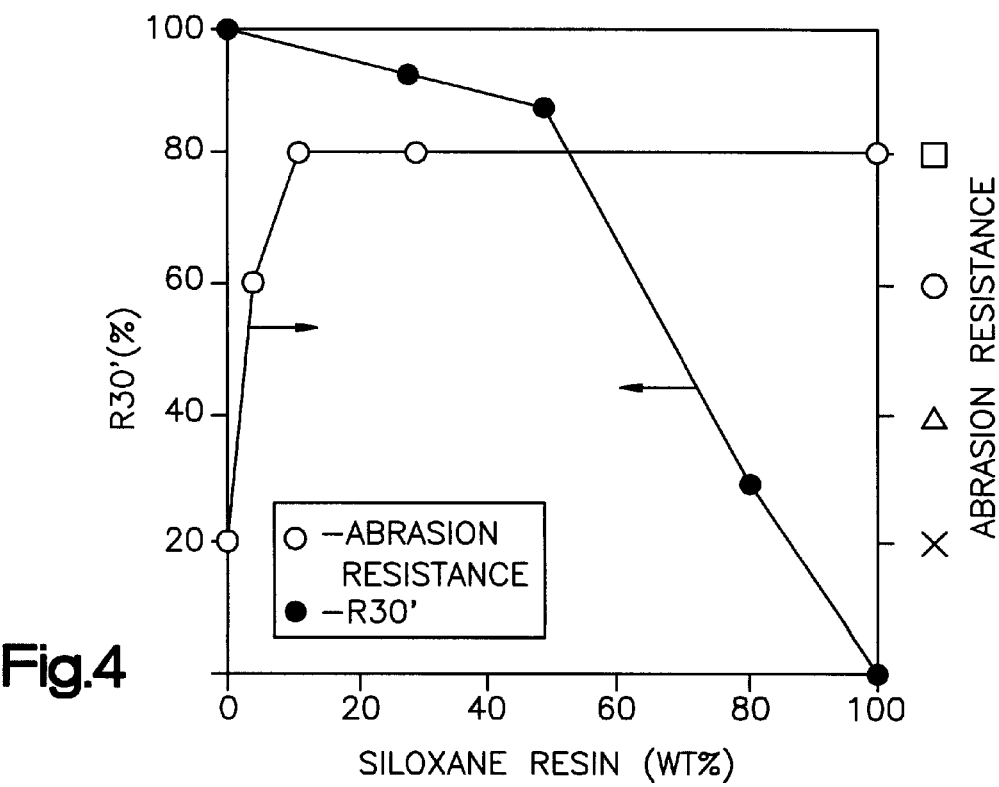
FIG. 4 is a graph showing the relationships between the added amount of a thermosetting resin, and abrasion resistance and photoactivity in the test of Example 4.

As for the resulting sample, deodorant activity and peeling resistance were evaluated. The results are shown in FIG. 4. In this case, in the same manner as in Example 2, by interposing the siloxane resin layer at an intermediate portion, peeling resistance became O by addition of 5% by weight or so of the matrix resin based on the total weight of the photocatalyst particles and the matrix resin. Further, by addition of 10% by weight or more of the matrix resin based on the total weight of the photocatalyst particles and the matrix resin, peeling resistance became ⊙. Also, as for deodorant activity, when the photocatalyst a particles are added in an amount of 50% by weight or more, it became 90% or more whereby good results are shown. In conclusion, in the same manner as in Example 2, it was found that good results are shown when the amount of the matrix resin based on the total weight of the photocatalyst particles and the matrix resin is 5% by weight or more and less than 80% by weight, preferably 5% by weight or more and 50% by weight or less.

EXAMPLE 5

(Copper, Mixing Method, Changing Copper Concentration)

First, a resin layer with a film thickness of about 5 μm was formed on an aluminum substrate with a size of 10 cm square in the same manner as in Example 2.

Next, the aqueous copper acetate solution and the titanium oxide sol used in Example 3 were mixed, and then, the silica sol used in Example 1 was added. After the resulting mixture was further diluted with ethanol, trimethoxymethylsilane used in Example 1 was added to obtain a liquid material. This liquid material was coated on the resin layer of the above-mentioned substrate, and dried at 150° C. to form a mixed layer with a film thickness of about 0.1 μm whereby a sample was obtained. Here, the weight ratio of the silica sol and trimethoxymethylsilane was made 3:1. Also, the weight ratio of the solid component weight (resin weight) of the silica sol and trimethoxymethylsilane and the solid component weight of the titanium oxide sol (photocatalyst weight) was changed variously (in a ratio of the resin weight based on the total weight of the resin weight and the photocatalyst weight, 0%, 10%, 20%, 50%, 80%, 90%, 100%), and the solid component weight of copper acetate based on the total weight of the resin weight and the photocatalyst weight was also changed variously (0%, 2%, 10%) to carry out the tests whereby deodorant activity and peeling resistance were evaluated.

Here, the deodorant activity was evaluated by R30. R30 can be specifically obtained by arranging a film-forming surface of a sample in 11 liters of a glass apparatus with a distance of 8 cm from a light source (a BLB lamp, 4W), injecting a methyl mercaptane gas into the apparatus to become an initial concentration of 3 ppm, and measuring change in concentration after 30 minutes at photoirradiation and at dark.

Evaluation of antibacterial activity was carried out by supporting 0.15 ml of 10$^5$ CFU/ml Escherichia coli on the sample surface, and after irradiating 0.02 mW/cm$^2$ of a FL lamp for 30 minutes, recovering bacteria to obtain survival ratio of bacteria. Evaluation index is shown below.

+++: Survival ratio of bacteria of less than 10%

++: Survival ratio of bacteria of 10% or more and less than 30%

+: Survival ratio of bacteria of 30% or more and less than 70%

−: Survival ratio of bacteria of 70% or more

Figure 5:
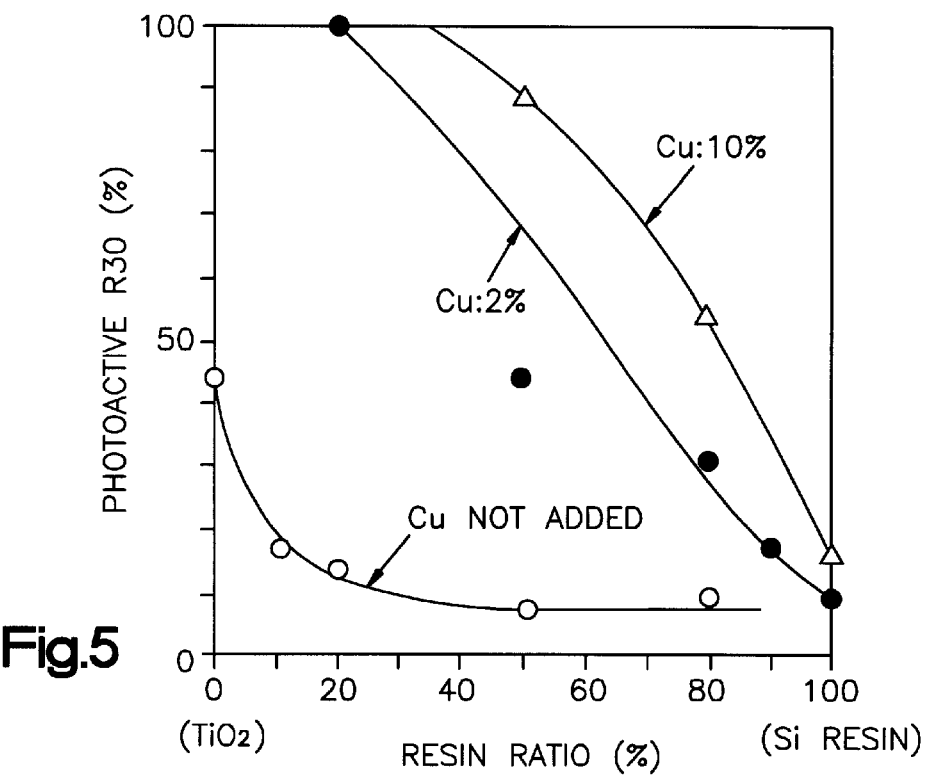
FIG. 5 is a graph showing the relationship between the resin ratio of the photocatalytic functional layer and photoactivity in Example 5.

In FIG. 5, results of deodorant activity is shown. At a film thickness of the photocatalytic functional layer of about 0.1 μm, when copper was not added, the R30 value was less than 50% even at the resin of 0%. However, when the photocatalyst weight based on the total amount of the resin weight and the photocatalyst weight exceeds 50% by adding at least 2% of copper, the R30 value exceeded 50%. Also, when 10% of copper was added, even when the photocatalyst weight based on the total amount of the resin weight and the photocatalyst weight was 20% or so, The R30 value exceeded 50% to show good value.

Figure 6:
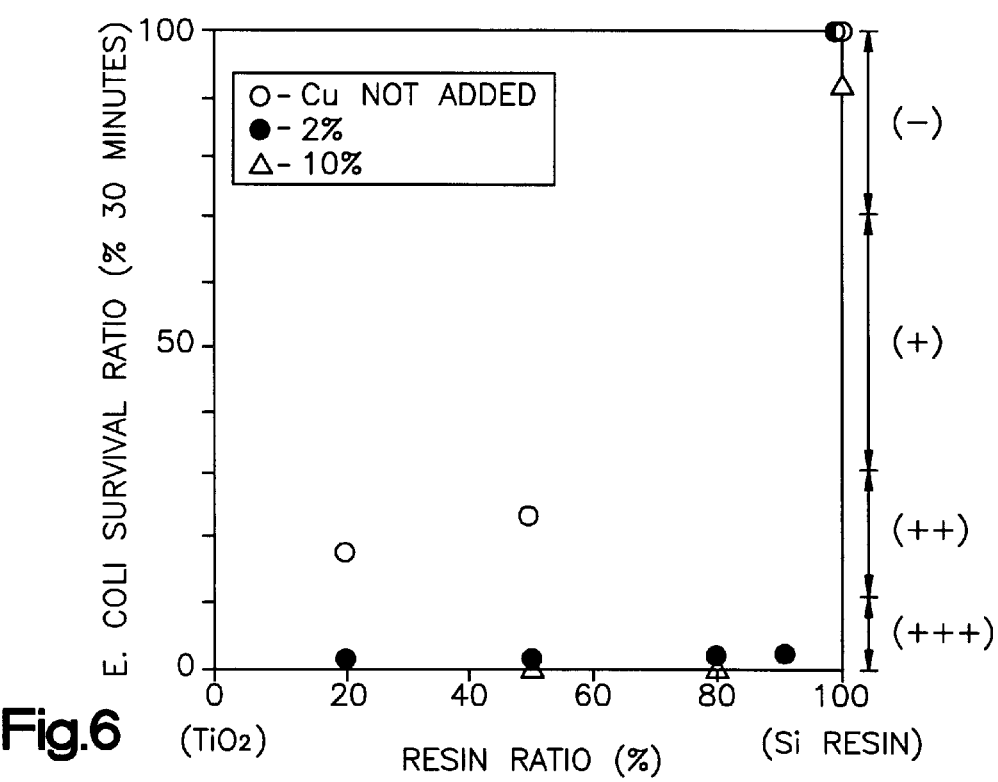
FIG. 6 is a graph showing the relationship between the resin ratio of the photocatalytic functional layer and the survival ratio of Escherichia coli in Example 5.

In FIG. 6, results of antibacterial activity is shown. At a film thickness of about 0.1 μm, when copper was not added, even when the photocatalyst weight based on the total amount of the resin weight and the photocatalyst weight was increased up to 80%, it did not reach to ++. To the contrary, by adding at least 2% of copper, even when the photocatalyst weight based on the total amount of the resin weight and the photocatalyst weight was decreased to 10% or so, it showed an antibacterial activity of +++.

EXAMPLE 6

Effect of Film Thickness

First, a resin layer with a film thickness of about 5 μm was formed on an aluminum substrate with a size of 10 cm square in the same manner as in Example 2.

Next, the aqueous copper acetate solution and the titanium oxide sol used in Example 3 were mixed, and then, the silica sol used in Example 1 was added. After the resulting mixture was further diluted with ethanol, trimethoxymethylsilane used in Example 1 was added to obtain a liquid material. This liquid material was coated on the resin layer of the above-mentioned substrate, and dried at 150 ° C. to form a photocatalytic functional layer with a various film thickness whereby samples were obtained. Here, the weight ratio of the silica sol and trimethoxymethyl silane was made 3:1. Here, the weight ratio of the solid component weight (resin weight) of the silica sol and trimethoxymethylsilane and the solid component weight of the titanium oxide sol (photocatalyst weight) was made 50%. The solid component weight of copper acetate based on the total weight of the resin weight and the photocatalyst weight was made 2%.

With regard to the resulting samples, deodorant activity and glossiness were evaluated.

Figure 7:
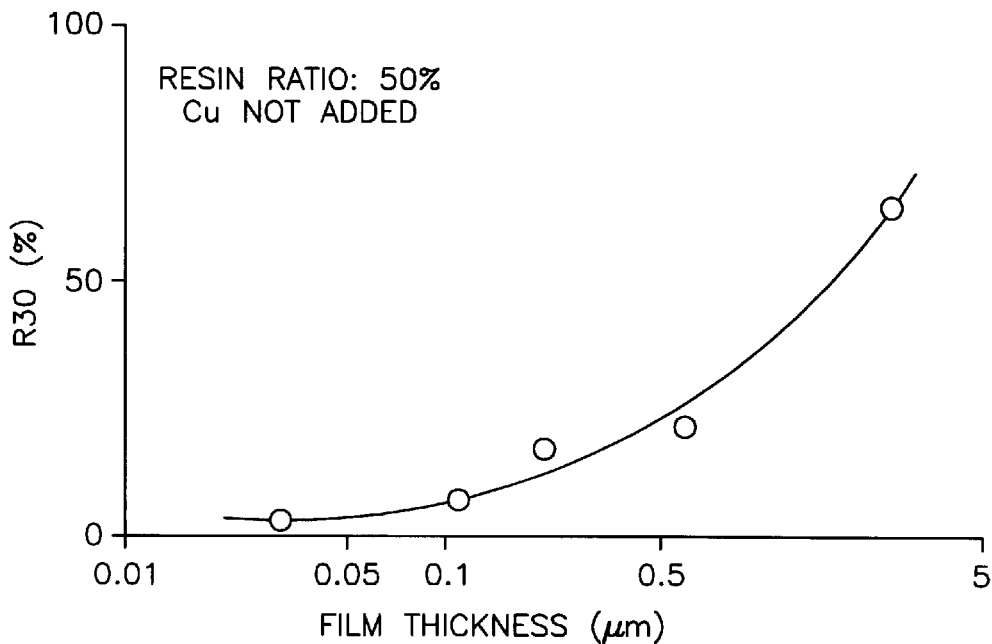
FIG. 7 is a graph showing deodorant activity of a sample to which no metal is added in the test of Example 6.

In FIG. 7, experimental results of deodorant activity when no metal had been added, which was measured for comparative purpose are shown. From the figure, if the film thickness does not exceed 3 $\mu$m or more, R30 does not exceed 50%.

Figure 8:
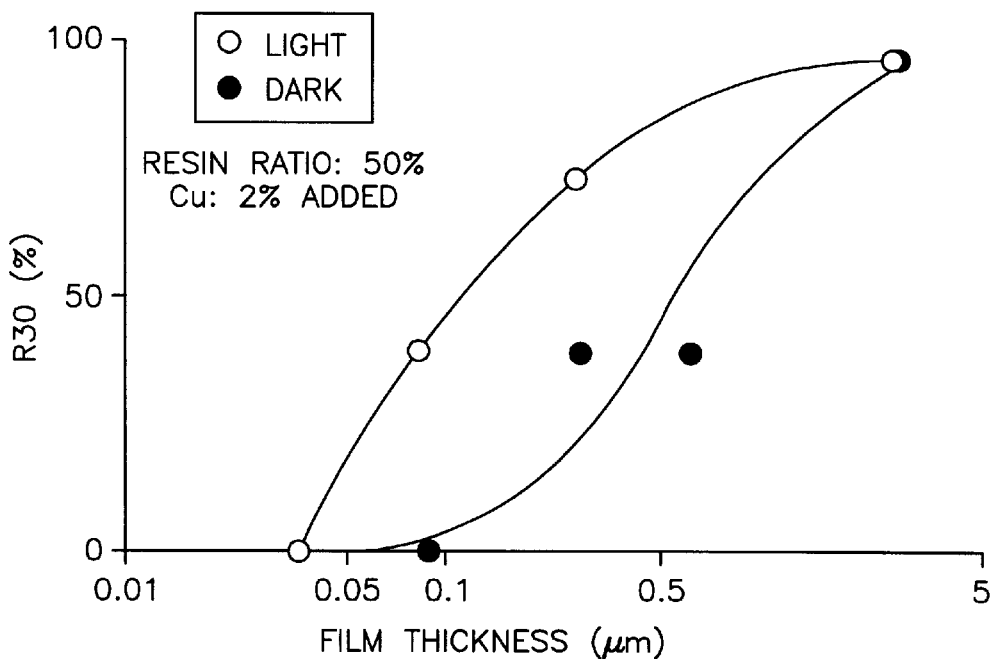
FIG. 8 is a graph showing deodorant activity of a sample to which copper is added in the test of Example 6.

In FIG. 8, experimental results of deodorant activity when copper was added are shown. Here, the white-blank points show the results at photoirradiation and the black blank points show those at dark. First, from the fact that the white-blank points are more than the black points, it can be found that the R30 value relates not only to adsorption due to copper but also to decomposition due to the photocatalyst. From the figure, it was found that the film thickness became 0.1 $\mu$m or more, R30 became a value of exceeding 50%, and it became 0.3 $\mu$m or more, R30 reached to 80% or more. That is, by adding a metal, sufficient deodorant activity was shown even when the film thickness was less than 3 $\mu$m.

Figure 9:
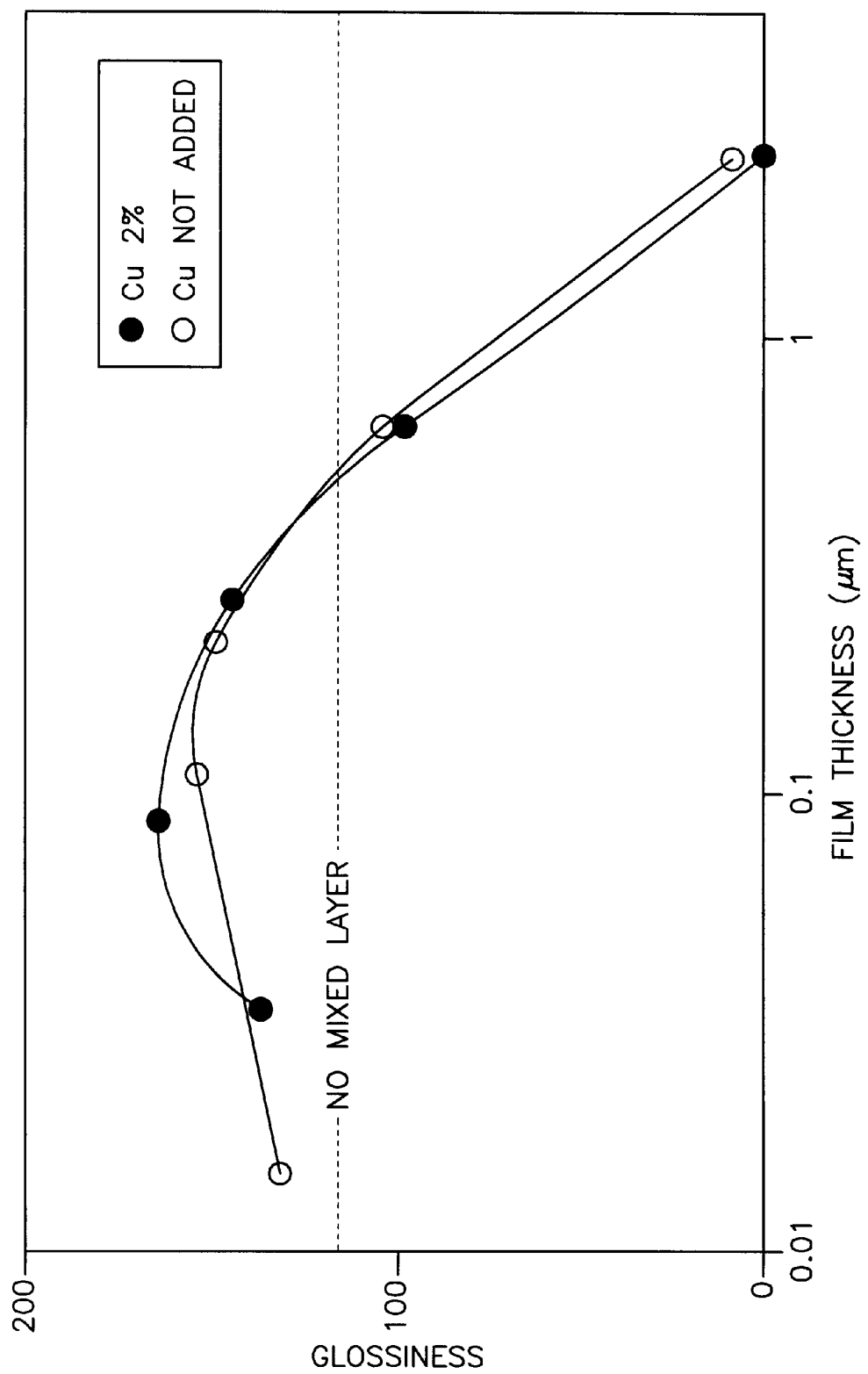
FIG. 9 is a graph showing the relationship between the film thickness of the photocatalytic functional layer and glossiness in the test of Example 6.

Also, in FIG. 9, measurement results of glossiness of samples are shown. Here, measurement of the glossiness was carried out by using a glossmeter (manufactured by Nihon Denshoku Kogyo, VGS-10) and measured by the method of JIS Z8741 with an incident angle of 60° . It was found that at the film thickness of 0.5 $\mu$m or less, the glossiness is rather good when the mixed layer of the resin and the photocatalyst is present and preferably in view of appearance. Accordingly, for obtaining good properties in both of deodorant activity and glossiness, it is preferred to add a metal.

EXAMPLE 7

Silver, Mixing Method

First, a resin layer with a film thickness of about 5 $\mu$m was formed on an aluminum substrate with a size of 10 cm square in the same manner as in Example 2.

Next, an aqueous silver nitrate (molecular weight 170) solution and the titanium oxide sol (elute concentration 10% by weight, nitric acid dispersion type, pH 0.8) used in Example 1 were mixed and a BLB lamp with 0.5 mW/cm$^2$ was irradiated for 15 minutes while stirring. Next, a silica sol was added to the mixture, the resulting mixture was diluted with ethanol, and then, trimethoxymethylsilane was added to obtain a liquid material. This liquid material was coated on the resin layer of the above-mentioned substrate, and dried at 150 ° C. to form a mixed layer with the film thickness of about 0.3 $\mu$m whereby a sample was obtained. Here, the weight ratio of the silica sol and trimethoxymethylsilane was made to become 3:1. Also, the crystal system of the titanium oxide was anatase. The weight ratio of the solid component weight (resin weight) of the silica sol and trimethoxymethylsilane and the solid component weight of the titanium oxide sol (photocatalyst weight) was made 50%. The solid component weight of silver nitrate based on the total weight of the resin weight and the photocatalyst weight was made 30%. With regard to the resulting sample, antibacterial activity and peeling resistance were evaluated.

As the results, the antibacterial activity was +++ and the peeling resistance was ⊚.

EXAMPLE 8

One Pack Type

First, a resin layer with a film thickness of about 5 $\mu$was formed on an aluminum substrate with a size of 10 cm square in the same manner as in Example 2.

Next, the aqueous copper acetate solution and the titanium oxide sol used in Example 3 were mixed, and then, the trimethoxymethylsilane used in Example 1 was added to the mixture, and the resulting mixture was diluted with ethanol to obtain a liquid material. This liquid material was coated on the resin layer of the above-mentioned substrate, and dried at 150° C. to form a photocatalytic functional layer with the film thickness of about 0.5 $\mu$m whereby a sample was obtained. The weight ratio of the solid component weight (resin weight) of the trimethoxymethylsilane and the solid component weight of the titanium oxide sol (photocatalyst weight) was made 50%. The solid component weight of copper acetate based on the total weight of the resin weight and the photocatalyst weight was made 2%.

With regard to the resulting sample, deodorant activity and peeling resistance were evaluated.

As the results, the deodorant activity was 95% with R30 and the peeling resistance became ⊚.

EXAMPLE 9

Fluoride Resin

To the titanium oxide sol used in Example 1 was added a water-dispersible fluoro resin coating solution (tetrafluoroethylene, hexafluoropropylene, vinylidene fluoride copolymer, elute concentration 50% by weight, available from Sumitomo 3M, THV350C), the resulting mixture was diluted with ethanol to obtain a liquid material. This liquid material was coated on an aluminum substrate with a size of 10 cm square, and dried at 150° C. to form a mixed layer with the film thickness of about 0.5 $\mu$m. The weight ratio of the solid component weight (resin weight) of the fluoro resin and the solid component weight of the titanium oxide sol (photocatalyst weight) was made 50%. Onto the above-mentioned mixed layer was coated an aqueous copper acetate (molecular weight 199.65) solution, and then, a BLB lamp with 0.5 mW/cm$^2$ was irradiated for two minutes to obtain a sample. The thus obtained film thickness of the photocatalytic functional layer was about 0.8 $\mu$m, and the crystal system of the titanium oxide was anatase. The weight ratio of the silica sol and trimethoxymethylsilane was made to become 3:1. Also, the copper amount supported on the sample surface was made 3 to 10 $\mu$g/cm$^2$ (which corresponds to 0.04 to 0.12% by weight based on the solid component weight of the titanium oxide and the resin).

With regard to the resulting sample, deodorant activity and peeling resistance were evaluated.

As the results, the deodorant activity was 97% with R30 and the peeling resistance became ⊚.

EXAMPLE 10

Enamel Substrate

After heating a stainless substrate to 600° C. glaze, flit was sprayed to prepare an enamel substrate having a size of 10 cm square. To this enamel substrate, an intermediate layer and a photocatalytic functional layer were formed in the same manner as in Example 2. However, the weight of the photocatalyst was made 50% based on the total weight of the photocatalyst and the resin.

With regard to the resulting sample, deodorant activity (R30) and abrasion resistance were evaluated. As the results, it showed good results that the deodorant activity was 84% and the abrasion resistance was ⊚.

EFFECTS OF THE INVENTION

As clearly seen from the above-mentioned explanation, the present invention can provide a photocatalytic functional material which can be produced even by a heat treatment at a lower temperature of less than 300° C. Also, on the substrate with various forms, photocatalytic function can be added with a simple and easy application method such as in situ adhering or coating. Particularly, a photocatalytic functional material having excellent characteristics in which both of peeling resistance and photocatalytic function are good can be provided, which could never be obtained by the conventional resin type matrix base.

What is claimed is:

1. A photocatalytic functional material, comprising:
   a substrate and a photocatalytic functional layer fixed to a surface of said substrate;
   said photocatalytic functional layer comprising:
   (1) a mixture layer comprising photocatalytic particles and a photodegradation-resistant matrix, and
   (2) a coating formed over said mixture layer, said coating being comprised of an electron-trapping metal;
   wherein said photodegradation-resistant matrix is a thermosetting resin.

2. A photocatalytic functional material as defined in claim 1, further comprising:
   a binder layer between said substrate and said photocatalytic functional layer, wherein said binder layer is adherent to both said substrate and said photocatalytic functional layer.

3. A photocatalytic functional material as defined in any one of claims 1, wherein the thickness of said photocatalytic functional layer is 0.1 to 5 μm.

4. A photocatalytic functional material as defined in any one of claims 1 and 2, wherein the concentration of said electron-trapping metal at the ultraviolet ray reaching depth of said photocatalytic functional layer is at least 0.006% by weight of the combined weight of said photocatalytic particles and said photodegradation-resistant matrix.

5. A photocatalytic functional material as defined in any one of claims 1 and 2, wherein the mixing ratio (resin weight/(resin weight +photocatalyst weight)) of said thermosetting resin and said photocatalyst particles in said photocatalytic functional layer is within the range of 0.10 to 0.50.

6. A photocatalytic functional material as defined in any one of claims 1 and 2, wherein said substrate is a tile.

7. A method for preparing a photocatalytic functional layer, comprising the steps of:
   preparing a first liquid material containing a photocatalyst and a thermosetting resin;
   applying said first liquid material to the surface of a substrate;
   curing said first liquid material to form a cured catalyst-resin mixture layer on said surface of said substrate;
   preparing a second liquid material containing an electron-trapping metal;
   applying said second liquid material to a surface of said cured catalyst-resin mixture layer; and
   irradiating said second liquid material with ultraviolet light to support said metal to said surface of said cured catalyst-resin mixture layer.

8. A photocatalytic functional material as in claim 1, wherein said metal is Cu or Ag.

* * * * *